(12) United States Patent
Park et al.

(10) Patent No.: US 12,500,222 B2
(45) Date of Patent: Dec. 16, 2025

(54) ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Gwangwon Park, Yongin-si (KR); Juhye Bae, Yongin-si (KR); Won-Gi Ahn, Yongin-si (KR); Taeil Lee, Yongin-si (KR); Min-young Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 262 days.

(21) Appl. No.: 18/003,681

(22) PCT Filed: Aug. 19, 2022

(86) PCT No.: PCT/KR2022/012407
§ 371 (c)(1),
(2) Date: Dec. 28, 2022

(87) PCT Pub. No.: WO2023/027431
PCT Pub. Date: Mar. 2, 2023

(65) Prior Publication Data
US 2024/0120461 A1    Apr. 11, 2024

(30) Foreign Application Priority Data
Aug. 25, 2021  (KR) .................. 10-2021-0112595

(51) Int. Cl.
*H01M 4/133*  (2010.01)
*H01M 4/02*   (2006.01)
*H01M 10/052* (2010.01)

(52) U.S. Cl.
CPC ......... *H01M 4/133* (2013.01); *H01M 10/052* (2013.01); *H01M 2004/021* (2013.01); *H01M 2004/027* (2013.01)

(58) Field of Classification Search
CPC ............... H01M 4/133; H01M 10/052; H01M 2004/021; H01M 2004/027; H01M 4/366;
(Continued)

(56) References Cited

U.S. PATENT DOCUMENTS

2008/0318133 A1  12/2008  Matsuyama et al.
2009/0140214 A1   6/2009  Sonobe et al.
(Continued)

FOREIGN PATENT DOCUMENTS

JP     09320569 A   * 12/1997   ............ Y02E 60/10
JP  2007-220454 A      8/2007
(Continued)

OTHER PUBLICATIONS

English Translation of JP-2017157529A (Year: 2017).*
(Continued)

*Primary Examiner* — Stewart A Fraser
(74) *Attorney, Agent, or Firm* — Womble Bond Dickinson (US) LLP

(57) ABSTRACT

Provided an electrode for a rechargeable lithium battery and a rechargeable lithium battery including the same, the electrode including a current collector and a first active material layer disposed on the current collector and including a first active material, and a second active material layer disposed on the first active material layer and including a second active material, wherein a porosity of the first active material layer is 8% to 12% and a porosity of the second active material layer is 16% to 22%.

10 Claims, 9 Drawing Sheets

(58) Field of Classification Search
CPC ............ H01M 4/02; H01M 4/36; H01M 4/38; H01M 4/62; H01M 10/0525
See application file for complete search history.

(56) References Cited

U.S. PATENT DOCUMENTS

| | | | |
|---|---|---|---|
| 2012/0009475 | A1 | 1/2012 | Nakura |
| 2014/0287316 | A1 | 9/2014 | Ahn et al. |
| 2015/0340730 | A1* | 11/2015 | Kim ...................... H01M 50/46 429/246 |
| 2016/0013471 | A1 | 1/2016 | Kaseda et al. |
| 2019/0393481 | A1 | 12/2019 | Fujioka |
| 2020/0303744 | A1 | 9/2020 | Katou et al. |
| 2020/0335795 | A1 | 10/2020 | Cha et al. |
| 2021/0143414 | A1* | 5/2021 | Guo ...................... H01M 4/366 |
| 2021/0336244 | A1* | 10/2021 | Kang ................... H01M 4/139 |
| 2022/0311009 | A1* | 9/2022 | Akimoto ........... H01M 10/0525 |

FOREIGN PATENT DOCUMENTS

| | | | | |
|---|---|---|---|---|
| JP | 5150966 | B2 * | 2/2013 | ............ Y02E 60/10 |
| JP | 5167703 | B2 * | 3/2013 | ........ H01M 10/0525 |
| JP | 2014-60063 | A | 4/2014 | |
| JP | 2015-37008 | A | 2/2015 | |
| JP | 2017157529 | A * | 9/2017 | ............ Y02E 60/10 |
| KR | 10-2006-0132864 | A | 12/2006 | |
| KR | 10-2011-0127209 | A | 11/2011 | |
| KR | 10-2014-0095980 | A | 8/2014 | |
| KR | 10-1560471 | B1 | 10/2015 | |
| KR | 10-2019-0051606 | A | 5/2019 | |
| KR | 2019051606 | A * | 5/2019 | ......... H01M 10/052 |
| WO | 2014/133063 | A1 | 9/2014 | |
| WO | 2017/169988 | A1 | 10/2017 | |
| WO | 2018/179894 | A1 | 10/2018 | |

OTHER PUBLICATIONS

International Search Report of PCT/KR2022/012407, Nov. 18, 2022, 3 pp.
Japanese Office Action issued in corresponding JP Application No. 2023-563037, dated Dec. 9, 2024, 7 pages.
Extended European Search Report issued in corresponding EP Application No. 22861641.3, dated Jul. 28, 2025, 4 pages.
Korean Office Action for KR Application No. 10-2021-0112595, dated Jul. 24, 2025, 9 pages.

* cited by examiner

ELECTRODE FOR RECHARGEABLE LITHIUM BATTERY AND RECHARGEABLE LITHIUM BATTERY INCLUDING THE SAME

CROSS-REFERENCE TO RELATED APPLICATIONS

This application is a U.S. National Phase Patent Application of International Application Number PCT/KR2022/012407, filed on Aug. 19, 2022, which claims priority of Korean Patent Application Number 10-2021-0112595, filed on Aug. 25, 2021, the entire content of each of which is incorporated herein by reference.

TECHNICAL FIELD

An electrode for a rechargeable lithium battery and a rechargeable lithium battery including the same are disclosed.

BACKGROUND ART

A portable information device such as a cell phone, a laptop, smart phone, and the like or an electric vehicle has used a rechargeable lithium battery having high energy density and easy portability as a driving power source. Recently, research has been actively conducted to use a rechargeable lithium battery with high energy density as a driving power source or power storage power source for hybrid or electric vehicles.

On the other hand, in order to conventionally secure high-rate charge/discharge characteristics of the battery, a limited method of lowering a thickness of an electrode plate, using a material with low resistance, and the like, which all are applicable to a general slot die coating method, has been tried. However, when the slot die coating technology is used, as resistance of the electrode plate increases due to migration of a binder component in an active material layer during the drying, since surface porosity of the active material layer decreases due to a high compression ratio of the active material layer surface during the compressing, there is a limit to improving high-rate charge/discharge characteristics due to the increased resistance to the lithium ion migration. Accordingly, research on how to improve the porosity of the electrode plate surface and lower the electrode plate resistance and thus improve high-rate charge/discharge characteristics of the battery is needed.

DISCLOSURE

Technical Problem

An electrode for a rechargeable lithium battery capable of improving the porosity of the surface of the electrode plate and lowering a resistance of the electrode plate to improve high-rate charge/discharge characteristics of the battery and a rechargeable lithium battery including the same are provided.

Technical Solution

In an embodiment, an electrode for a rechargeable lithium battery includes a current collector and a first active material layer disposed on the current collector and including a first active material, and a second active material layer disposed on the first active material layer and including a second active material, wherein a porosity of the first active material layer is 8% to 12% and a porosity of the second active material layer is 16% to 22%.

Another embodiment provides a rechargeable lithium battery including the electrode, a separator, and an electrolyte.

Advantageous Effects

The electrode for the rechargeable lithium battery according to an embodiment may improve surface porosity, reduce electrode plate resistance, and improve high-rate charge/discharge characteristics and cycle-life characteristics of a battery.

MODE FOR INVENTION

Figure 1:
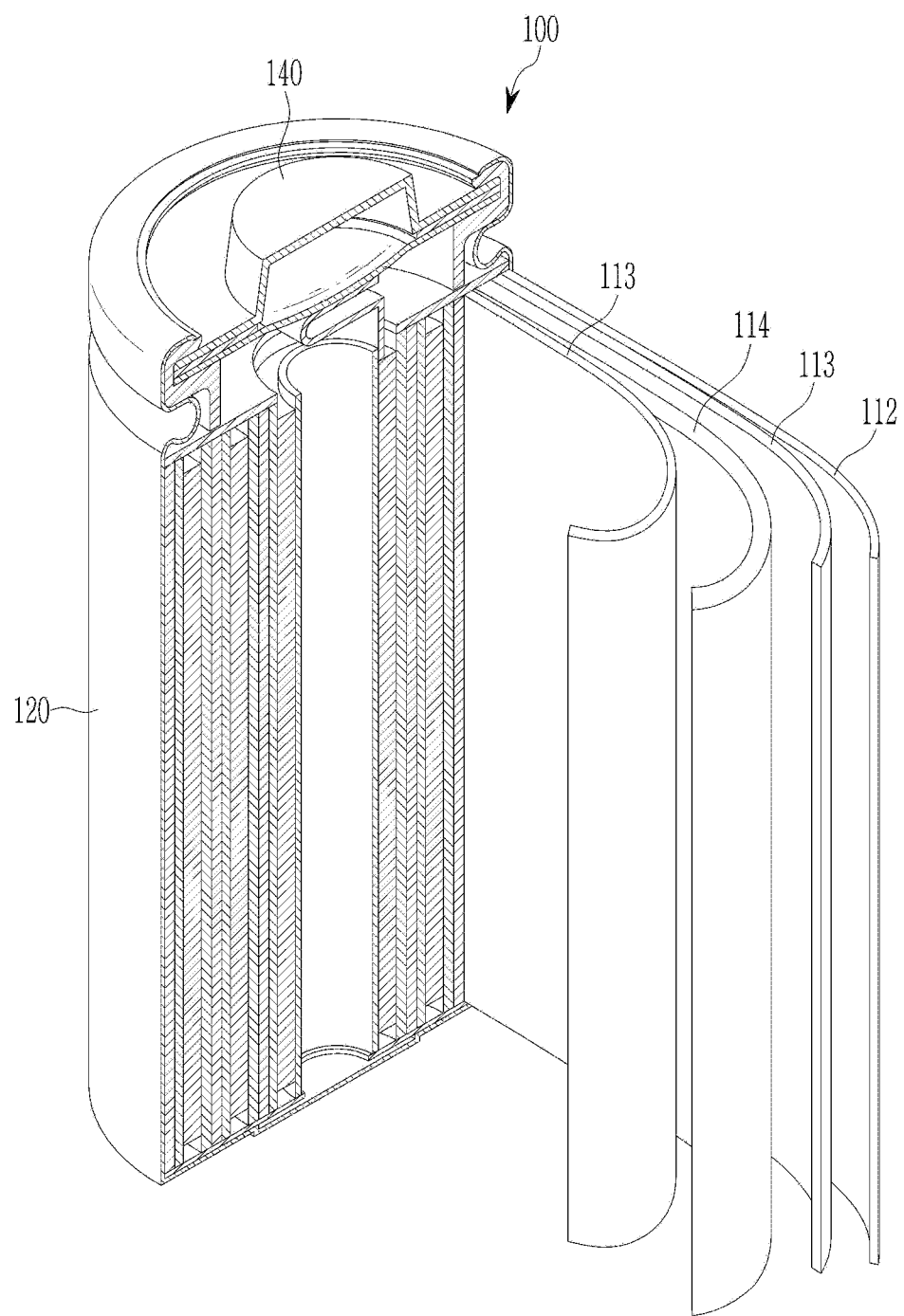
FIG. 1 is a schematic view illustrating a rechargeable lithium battery according to an embodiment.

Hereinafter, specific embodiments will be described in detail so that those of ordinary skill in the art can easily implement them. However, this disclosure may be embodied in many different forms and is not construed as limited to the example embodiments set forth herein.

The terminology used herein is used to describe embodiments only, and is not intended to limit the present invention. The singular expression includes the plural expression unless the context clearly dictates otherwise.

Herein, "combination thereof" means a mixture, laminate, composite, copolymer, alloy, blend, reaction product, and the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on"

another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

In addition, the average particle diameter may be measured by a method well known to those skilled in the art, for example, may be measured by a particle size analyzer, or may be measured by a transmission electron micrograph or a scanning electron micrograph. Alternatively, it is possible to obtain an average particle diameter value by measuring using a dynamic light scattering method, performing data analysis, counting the number of particles for each particle size range, and calculating from this. Unless otherwise defined, the average particle diameter may mean the diameter (D50) of particles having a cumulative volume of 50 volume % in the particle size distribution.

Electrode for Rechargeable Lithium Battery

In an embodiment, an electrode for a rechargeable lithium battery includes a current collector and a first active material layer disposed on the current collector and including a first active material, and a second active material layer disposed on the first active material layer and including a second active material, wherein a porosity of the first active material layer is 8% to 12% and a porosity of the second active material layer is 16% to 22%.

The electrode for the rechargeable lithium battery according to an embodiment may be a double-layer or multi-layer electrode having two or more active material layers. This electrode may be manufactured by using a double slot die or a multi slot die. An embodiment is an invention of manufacturing an electrode by coating two or more active material layers with a double slot die and the like to improve the electrode plate resistance increase as well as maximize capacity and thus improve porosity of the electrode plate surface and lower the electrode plate resistance, resultantly improving high-rate charge/discharge characteristics of the battery.

In general, when an active material layer of an electrode is coated with a general slot die, an upper portion of the active material layer may have a higher compression ratio than a lower portion thereof during the compressing process. Accordingly, as porosity of the upper portion is lowered, there is a problem of increasing electrode plate resistance. On the contrary, the electrode according to an embodiment is coated with a slot die and thus has a higher compression ratio in the upper portion than the lower portion but has higher porosity in the upper portion than the lower portion much higher to reduce the electrode plate resistance and improve high-rate charge/discharge characteristics of the battery.

First Active Material layer

The first active material layer is a layer on the current collector among double or multi-layers and has a porosity of 8% to 12%. The porosity may be a value measured after coating the active material layer on the current collector, drying it, and then compressing it. In addition, the porosity may be obtained by photographing a cross section of the compressed electrode plate with an optical microscope such as a scanning electron microscope and measuring an area ratio of the portion occupied by the pores in the active material layer using an image analysis program such as Image J. The porosity of the first active material layer may be, for example, 8% to 12%, 9% to 12%, 10% to 12%, or 11% to 12%. When the first active material layer satisfies such a porosity, high capacity and high energy density may be realized and high-rate charge/discharge characteristics may be improved.

The first active material layer includes a first active material, and the first active material may be a material having a relatively high compression ratio. For example, a pellet density of the first active material may be greater than or equal to 1.7 g/cm$^3$, for example, 1.7 g/cm$^3$ to 2.0 g/cm$^3$, 1.7 g/cm$^3$ to 1.9 g/cm$^3$, or 1.7 g/cm$^3$ to 1.8 g/cm$^3$. Also, a tap density of the first active material may be greater than or equal to 1.1 g/cm$^3$ or greater than 1.1 g/cm$^3$, and may be, for example, 1.1 g/cm$^3$ to 1.4 g/cm$^3$, 1.1 g/cm$^3$ to 1.3 g/cm$^3$. When the pellet density and tap density of the first active material satisfy these ranges, high capacity and high energy density may be satisfied while high-rate charge/discharge characteristics may be improved.

An average particle diameter (D50) of the first active material may be, for example, 12 μm to 30 μm, 13 μm to 25 μm, 14 μm to 23 μm, 15 μm to 22 μm, or 16 μm to 30 μm. In this case, the first active material may exhibit high capacity and high energy density.

A specific surface area of the first active material may be greater than or equal to 1.5 m$^2$/g, for example, 1.5 m$^2$/g to 2.5 m$^2$/g, 1.6 m$^2$/g to 2.3 m$^2$/g, 1.7 m$^2$/g to 2.1 m$^2$/g, or 1.8 m$^2$/g to 2.0 m$^2$/g. In this case, the first active material may realize high capacity and high energy density.

The first active material may be, for example, a carbon-based active material. The carbon-based active material means an active material containing carbon. The carbon-based active material may include crystalline carbon, amorphous carbon, or a combination thereof. Examples of the crystalline carbon include amorphous, plate-like, flake-like, spherical or fibrous graphite, and the graphite may be natural graphite or artificial graphite. Examples of the amorphous carbon include soft carbon, hard carbon, mesophase pitch carbonized product, calcined coke, and the like.

The first active material layer may further include a silicon-based active material in addition to the first active material, and in this case, a rechargeable lithium battery may realize higher capacity. The silicon-based active material means an active material containing silicon (Si). The silicon-based active material may include silicon, a silicon-carbon composite, $SiO_x$ (0<x<2), a Si-Q alloy (Q is an element selected from an alkali metal, an alkaline earth metal, a Group 13 element, a Group 14 element, a Group 15 element, a Group 16 element), a transition metal, a rare earth element, and a combination thereof, but not Si), and the like.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin such as a phenol resin, a furan resin, or a polyimide resin. In this case, the content of silicon may be 10 wt % to 50 wt % based on the total weight of the silicon-carbon composite. In addition, the content of the crystalline carbon may be 10 wt % to 70 wt % based on the total weight of the silicon-carbon composite, and the content of the amorphous carbon may be 20 wt % to 40 wt % based on the total weight of the silicon-carbon composite. In addition, a thickness of the amorphous carbon coating layer may be 5 nm to 100 nm. An average particle diameter (D50) of the silicon particles may be 10 nm to 20 μm. The silicon particles may exist in an oxidized form, and in this case, an atomic content ratio of Si:O in the silicon particles indicating a degree of oxidation may be a weight ratio of 99:1 to 33:67. The silicon particles may be $SiO_x$ particles, and in this case, the range of x in $SiO_x$ may be greater than 0 and less than 2.

An average particle diameter (D50) of the silicon-based active material may be 1 μm to 20 μm, for example, 5 μm to 15 μm. The silicon-based active material may have a tap density of 0.3 g/cc to 1.1 g/cc, and for example, 0.5 g/cc to 1.0 g/cc. In addition, the silicon-based active material may have a specific surface area of 1.9 m²/g to 2.7 m²/g, for example 2.0 m²/g to 2.5 m²/g. When physical properties of the silicon-based active material satisfy these ranges, a negative electrode including the silicon-based active material may improve general battery performance such as cycle-life characteristics and charge/discharge efficiency while realizing high capacity.

Meanwhile, the specific surface area may be measured through a nitrogen adsorption method and may mean a BET specific surface area.

Based on the total weight of the first active material and the silicon-based active material, the silicon-based active material may be included in a range of 1 wt % to 20 wt %, or 5 wt % to 15 wt %. In this case, excellent cycle-life characteristics and high-rate charge/discharge characteristics may be exhibited while implementing high capacity.

The first active material layer may further include a binder in addition to the first active material.

The binder serves to attach the active material particles to each other, to attach the active material to the current collector, or to attach the active material layers to each other. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. The alkali metal may be Na, K, or Li. The amount of such a thickener used may be 0.1 parts by weight to 3 parts by weight based on 100 parts by weight of the negative electrode active material.

A content of the binder may be 1.0 wt % to 5.0 wt %, for example, 1.0 wt % to 4.0 wt % or 2.0 wt % to 3.0 wt %, based on the total weight of the first active material layer.

The content of the binder included in the first active material layer may be larger than that of a binder included in a second active material layer, which will be described later. In general, when an active material layer is coated with a slot die, a binder component may migrate during the drying and exist more at an active material layer surface side rather than a current collector side. Accordingly, at the active material layer surface side, resistance of lithium ions occurs, deteriorating high-rate charge/discharge characteristics. On the contrary, an embodiment is to form an electrode plate with a relatively uniform composition distribution after the drying by having a high binder content in the first active material layer, a lower portion but a low binder content in the second active material layer, an upper portion, reduce the migration resistance of lithium ions on the electrode surface, and thereby, improve battery characteristics such as high-rate charge/discharge characteristics, cycle-life characteristics, and the like.

For example, the binder of the first active material layer and the binder of the second active material layer may have a weight ratio of 60:40 to 95:5, for example, 65:35 to 95:5, or 70:30 to 90:10. Herein, the electrode plate resistance may be lowered, and the high-rate charge/discharge characteristics of the battery may be improved.

A thickness of the first active material layer may be about 30 μm to 100 μm, for example, 30 μm to 90 μm, 30 μm to 80 μm, or 40 μm to 70 μm. The thickness of the first active material layer may be similar to that of the second active material layer, which will be described later, and a total thickness of the active material layer may be about 60 μm to 200 μm, wherein the electrode plate is made to be thicker, maximizing capacity.

Second Active Material Layer

The second active material layer is a layer located on the first active material layer or on the outermost surface in a bilayer or a multi-layer and has porosity of 16% to 22%. Likewise, porosity of the second active material layer may be measured after coating then, drying and compressing the active material layer and obtained as an area ratio of the porosity in the active material layer by using an image analysis program. The porosity of the second active material layer may be, for example, 16% to 22%, 16% to 21%, 16% to 20%, or 17% to 19%. In general, in a technology of coating an active material layer with a slot die, a compression ratio of the active material layer surface increases, decreasing porosity. On the contrary, the porosity of the second active material layer in an embodiment is improved and thus keeps 16% to 22%, thereby lowering the electrode plate resistance, improving high-rate charge/discharge characteristics of a battery, and thus realizing a high-capacity and high-energy density battery.

The second active material layer includes a second active material. The second active material is a material having a lower compression ratio than the aforementioned first active material. An embodiment is to dispose an active material with a low compression ratio on the upper portion of the active material layer to increase porosity of the upper portion and reduce the electrode plate resistance and thereby, improve high-rate charge/discharge characteristics of the battery. In addition, an energy density loss may be minimized, realizing a high-capacity and high-energy density battery.

Pellet density and tap density of the second active material may be smaller than those of the first active material. For example, the pellet density of the second active material may be less than 1.6 g/cm³, for example, 1.3 g/cm³ to 1.59 g/cm³, 1.4 g/cm³ to 1.57 g/cm³, 1.5 g/cm³ to 1.55 g/cm³, or the like. In addition, the tap density of the second active material may be less than or equal to 1.1 g/cm³ or less than 1.1 g/cm³, for example, 0.9 g/cm³ to 1.1 g/cm³, 1.0 g/cm³ to 1.1 g/cm³, 0.9 g/cm³ to 1.05 g/cm³, or the like. When a material with pellet density or tap density within the ranges may be disposed in the upper portion, that is, the second active material layer, the second active material layer may have porosity of 16% to 22% after the drying and the compressing, thereby improving high-rate charge/discharge characteristics of a battery and thus realizing a high-energy density battery.

The second active material may have a smaller average particle diameter than that of the first active material. For example, the average particle diameter (D50) of the second active material may be less than or equal to 15 µm, and may be, for example, 3 µm to 15 µm, 5 µm to 14 µm, 6 µm to 13 µm, or 7 µm to 12 µm. When the average particle diameter ranges of the second active material are satisfied, high-capacity and high energy density may not only be realized, but also electrode surface porosity may be improved.

A specific surface area of the second active material may be smaller than that of the first active material. The specific surface area of the second active material may be less than or equal to 2.0 m²/g, for example 0.1 m²/g to 2.0 m²/g, 0.5 m²/g to 1.9 m²/g, 0.7 m²/g to 1.8 m²/g, 1.0 m²/g to 1.7 m²/g, or the like.

A product of the average particle diameter (D50, µm) and the specific surface area (m²/g) of the second active material may be less than may be less than 20, for example 6 to 19.5, 7 to 19, 10 to 19, or the like. In this way, when the product of the average particle diameter and the specific surface is small, less than 20, porosity in a second active material layer having a high compression ratio may be improved and exhibit 16% to 22%, resulting in lowering the electrode plate resistance and improving high-rate charge/discharge characteristics of a battery. In addition, a high-capacity and high-energy density battery may be realized.

The second active material may be, for example, a carbon-based active material. The carbon-based active material may include crystalline carbon, amorphous carbon, or a combination thereof. Examples of the crystalline carbon include amorphous, plate-like, flake-like, spherical or fibrous graphite, and the graphite may be natural graphite or artificial graphite. Examples of the amorphous carbon include soft carbon, hard carbon, mesophase pitch carbonized product, calcined coke, and the like.

The second active material layer may further include a silicon-based active material in addition to the second active material, and in this case, the rechargeable lithium battery may realize higher capacity. The silicon-based active material is the same as described in the first active material layer.

The silicon-based active material may be included in an amount of 1 wt % to 20 wt %, or 5 wt % to 15 wt %, based on the total weight of the second active material and the silicon-based active material. In this case, excellent cycle-life characteristics and high-rate charge/discharge characteristics may be exhibited while implementing high capacity.

The second active material layer may further include a binder in addition to the second active material. The type of the binder is as described in the first active material layer.

An amount of the binder may be 0.1 wt % to 3.0 wt %, for example, 0.1 wt % to 2.0 wt % or 0.2 wt % to 1.0 wt %, based on the total weight of the second active material layer.

A content of the binder included in the second active material layer may be smaller than a content of the binder included in the aforementioned first active material layer. As described above, in general, a lot of binder is present in the upper layer of the active material layer after drying and compressing, but in the electrode according to an embodiment, since a smaller amount of the binder is present in the second active material layer corresponding to the upper layer, resistance of the electrode plate may be reduced and high-rate charge/discharge characteristics of the battery may be improved.

A thickness of the second active material layer may be about 30 µm to 100 µm, for example, 30 µm to 90 µm, 30 µm to 80 µm, or 40 µm to 70 µm. The thickness of the second active material layer may be similar to the thickness of the aforementioned first active material layer, and for example, a ratio of the thickness of the first active material layer to the thickness of the second active material layer may be 45:55 to 55:45.

The current collector may be selected from a copper foil, a nickel foil, a stainless steel foil, a titanium foil, a nickel foam, a copper foam, a conductive metal-coated polymer substrate, and a combination thereof.

Meanwhile, an electrode for a rechargeable lithium battery according to an embodiment may be a positive electrode or a negative electrode. When the electrode is a negative electrode, as described above, the first active material and the second active material may be carbon-based active materials.

In the case of a positive electrode, the following positive electrode active material may be included in the active material layer. The positive electrode active material may include lithiated intercalation compounds that reversibly intercalate and deintercalate lithium ions. Examples of the positive electrode active material include a compound represented by any one of the following chemical formulas:

$Li_aA_{1-b}X_bD_2(0.90 \leq a \leq 1.8, 0 \leq b \leq 0.5)$;

$Li_aA_{1-b}X_bO_{2-c}D_c(0.90 \leq a \leq 1.8, 0 \leq b \leq 0.5, 0 \leq c \leq 0.05)$;

$Li_aE_{1-b}X_bO_{2-c}D_c(0.90 \leq a \leq 1.8, 0 \leq b \leq 0.5, 0 \leq c \leq 0.05)$;

$Li_aE_{2-b}X_bO_{4-c}D_c(0.90 \leq a \leq 1.8, 0 \leq b \leq 0.5, 0 \leq c \leq 0.05)$;

$Li_aNi_{1-b-c}Co_bX_cD_\alpha(0.90 \leq a \leq 1.8, 0 \leq b \leq 0.5, 0 \leq c \leq 0.5, 0 < \alpha \leq 2)$;

$Li_aNi_{1-b-c}Co_bX_cO_{2-\alpha}T_\alpha(0.90 \leq a \leq 1.8, 0 \leq b \leq 0.5, 0 \leq c \leq 0.05, 0 < \alpha < 2)$;

$Li_aNi_{1-b-c}Co_bX_cO_{2-\alpha}T_2(0.90 \leq a \leq 1.8, 0 \leq b \leq 0.5, 0 \leq c \leq 0.05, 0 < \alpha < 2)$;

$Li_aNi_{1-b-c}Mn_bX_cD_\alpha(0.90 \leq a \leq 1.8, 0 \leq b \leq 0.5, 0 \leq c \leq 0.05, 0 < \alpha \leq 2)$;

$Li_aNi_{1-b-c}Mn_bX_cO_{2-\alpha}T_\alpha(0.90 \leq a \leq 1.8, 0 \leq b \leq 0.5, 0 \leq c \leq 0.05, 0 < \alpha < 2)$;

$Li_aNi_{1-b-c}Mn_bX_cO_{2-\alpha}T_2(0.90 \leq a \leq 1.8, 0 \leq b \leq 0.5, 0 \leq c \leq 0.05, 0 < \alpha < 2)$;

$Li_aNi_bE_cG_dO_2(0.90 \leq a \leq 1.8, 0 \leq b \leq 0.9, 0 \leq C \leq 0.5, 0.001 \leq d \leq 0.1)$;

$Li_aNi_bCo_cMn_dG_eO_2(0.90 \leq a \leq 1.8, 0 \leq b \leq 0.9, 0 \leq c \leq 0.5, 0 \leq d \leq 0.5, 0.001 \leq e \leq 0.1)$;

$Li_aNiG_bO_2(0.90 \leq a \leq 1.8, 0.001 \leq b \leq 0.1)$;

$Li_aCoG_bO_2(0.90 \leq a \leq 1.8, 0.001 \leq b \leq 0.1)$;

$Li_aMn_{1-b}G_bO_2(0.90 \leq a \leq 1.8, 0.001 \leq b \leq 0.1)$;

$Li_aMn_2G_bO_4(0.90 \leq a \leq 1.8, 0.001 \leq b \leq 0.1)$;

$Li_aMn_{1-g}G_gPO_4(0.90 \leq a \leq 1.8, 0 \leq g \leq 0.5)$;

$QO_2; QS_2; LiQS_2$;

$V_2O_5$;$LiV_2O_5$;

$LiZO_2$;

$LiNiVO_4$;

$Li_{(3-f)}J_2(PO_4)_3 (0 \leq f \leq 2)$;

$Li_{(3-f)}Fe_2(PO_4)_3 (0 \leq f \leq 2)$; and $Li_aFePO_4 (0.90 \leq a \leq 1.8)$.

wherein, in the above chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

Of course, one having a coating layer on the surface of the compound may be used, or a mixture of the compound and a compound having a coating layer may be used. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a combination thereof. The coating layer forming process may use a method that does not adversely affect the physical properties of the positive electrode active material, such as spray coating or dipping.

The positive electrode active material may include, for example, at least one of lithium composite oxides represented by Chemical Formula 11.

[Chemical Formula 11]

In Chemical Formula 11, $0.9 \leq a \leq 1.8$, $0 \leq y11 \leq 1$, $0 \leq z11 \leq 1$, $0 \leq y11+z11 < 1$, and $M^{11}$, $M^{12}$, and $M^{13}$ are each independently any one selected from elements such as Ni, Co, Mn, Al, Mg, Ti, or Fe, and a combination thereof.

For example, $M^{11}$ may be Ni, and $M^{12}$ and $M^{13}$ may each independently be a metal such as Co, Mn, Al, Mg, Ti, or Fe. In a specific embodiment, $M^{11}$ may be Ni, $M^{12}$ may be Co, and $M^{13}$ may be Mn or Al, but they are not limited thereto.

In an embodiment, the positive electrode active material may include a lithium nickel-based composite oxide represented by Chemical Formula 12.

[Chemical Formula 12]

In Chemical Formula 12, $0.9 \leq a12 \leq 1.8$, $0.3 \leq x12 \leq 1$, $0 \leq y12 \leq 0.7$, and $M^{14}$ and $M^{15}$ are each independently at least one element selected from Al, B, Ce, Co, Cr, F, Mg, Mn, Mo, Nb, P, S, Si, Sr, Ti, V, W, and Zr.

The positive electrode active material may include, for example, lithium nickel cobalt-based oxide represented by Chemical Formula 13.

[Chemical Formula 13]

In Chemical Formula 13, $0.9 \leq a13 \leq 1.8$, $0.3 \leq x13 < 1$, $0 < y13 \leq 0.7$, and $M^{16}$ is at least one element selected from Al, B, Ce, Cr, F, Mg, Mn, Mo, Nb, P, S, Si, Sr, Ti, V, W, and Zr.

A content of the positive electrode active material may be 90 wt % to 98 wt %, for example, 90 wt % to 95 wt %, based on the total weight of the positive electrode active material layer. The positive electrode active material layer may further include a binder and/or a conductive material, and contents thereof may be 1 wt % to 5 wt %, respectively, based on the total weight of the positive electrode active material layer.

The binder improves binding properties of positive electrode active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, a carbon nanotube, and the like; a metal-based material of a metal powder or a metal fiber including copper, nickel, aluminum, silver, and the like; a conductive polymer such as a polyphenylene derivative; or a mixture thereof.

An aluminum foil may be used as the positive electrode current collector, but is not limited thereto.

Rechargeable Lithium Battery

In an embodiment, a rechargeable lithium battery including the aforementioned electrode, separator, and electrolyte is provided. Specifically, the rechargeable lithium battery provides a rechargeable lithium battery including a positive electrode, a negative electrode, a separator disposed therebetween, and an electrolyte. Herein, at least one of the positive electrode and the negative electrode may be the aforementioned electrode, and for example, the negative electrode may be the aforementioned electrode.

FIG. 1 is a schematic view illustrating a rechargeable lithium battery according to an embodiment. Referring to FIG. 1, a rechargeable lithium battery 100 according to an embodiment of the present invention includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include methyl acetate, ethyl acetate, n-propyl acetate, dim ethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like and the ketone-based solvent may be cyclohexanone, and the like. In addition, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

In addition, in the case of the carbonate-based solvent, a mixture of a cyclic carbonate and a chain carbonate may be used. In this case, when the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula I.

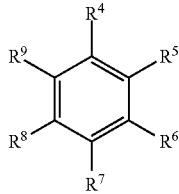

[Chemical Formula I]

In Chemical Formula I, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula II in order to improve cycle-life of a battery.

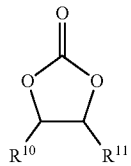

[Chemical Formula II]

In Chemical Formula II, $R^{10}$ and $R^{11}$ are the same or different and selected from hydrogen, a halogen, a cyano group, a nitro group, and fluorinated C1 to C5 alkyl group, provided that at least one of $R^{10}$ and $R^{11}$ is a halogen, a cyano group, a nitro group, and fluorinated C1 to C5 alkyl group, and $R^{10}$ and $R^{11}$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide): LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer ranging from 1 to 20, lithium difluoro (bisoxolato) phosphate, LiCI, LiI, $LiB(C_2O_4)_2$ (lithium bis (oxalato) borate: LiBOB), and lithium difluoro(oxalato) borate (LiDFOB).

The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The separator 113 that is also called a separating layer separates a positive electrode 114 and a negative electrode 112 and provides a transporting passage for lithium ions and may be any generally-used separator in a lithium ion battery. In other words, it may have low resistance to ion transport and excellent impregnation for an electrolyte. For example, separator may be selected from a glass fiber, polyester, Teflon, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and manufacturing methods of these batteries are well known in the art, and thus detailed descriptions thereof will be omitted.

The rechargeable lithium battery according to an embodiment may be used in IT mobile devices and the like due to high capacity, excellent storage stability at high temperature, cycle-life characteristics, and high-rate capability.

DETAILED DESCRIPTION OF THE EMBODIMENTS

Hereinafter, examples of the present invention and comparative examples are described. It is to be understood, however, that the examples are for the purpose of illustration and are not to be construed as limiting the present invention.

Example 1

Manufacture of Negative Electrode

Graphite having pellet density of about 1.74 g/cm$^3$, tap density of about 1.27 g/cm$^3$, an average particle diameter (D50) of about 16 μm, and a specific surface area of about 1.8 m$^2$/g was used as a first active material. 86 wt % of the first active material was mixed with 14 wt % of a silicon-based active material, preparing an active material. The used silicon-based active material was a silicon-carbon composite having a core including artificial graphite and silicon particles and coated with soft carbon on the surface and having an average particle diameter (D50) of about 10.2 μm.

96.38 wt % of the prepared active material, 2.72 wt % of a styrene-butadiene rubber, and 0.9 wt % of carboxylmethyl cellulose were mixed in distilled water, preparing a first active material layer composition.

As for a second active material, graphite having pellet density of about 1.50 g/cm$^3$, tap density of about 1.00 g/cm$^3$, an average particle diameter (D50) of about 11.40 μm, a specific surface area of 1.63 m$^2$/g, and a product of the average particle diameter and the specific surface area of 18.58 was used. 98.42 wt % of the second active material, 0.68 wt % of a styrene-butadiene rubber, and 0.9 wt % of carboxylmethyl cellulose were mixed in distilled water, preparing a second active material layer composition.

The first active material layer composition and the second active material layer composition were simultaneously coated on a current collector by using a double slot die coating equipment and then, dried and compressed, so that the current collector, a first active material layer, and a second active material layer might be sequentially stacked. After the compressing, when a negative electrode plate therefrom was measured with respect to a thickness, a negative electrode active material layer on one side of the current collector had a thickness of about 100 μm, in which a thickness of the first active material layer was about 50 μm, and a thickness of the second active material layer was about 50 μm.

Manufacture of Battery Cells

A coin half-cell was manufactured by disposing a separator having a polyethylene polypropylene multi-layer structure between the prepared negative electrode and a lithium metal counter electrode and then, injecting an electrolyte in which 1.0 M LiPF$_6$ lithium salt was added to a solvent prepared by mixing ethylene carbonate and diethyl carbonate in a volume ratio of 50:50.

Comparative Example 1

96.38 wt % of an active material prepared by mixing 93 wt % of the first active material used in Example 1 was mixed with 7 wt % of a silicon-based active material, 2.72 wt % of a styrene-butadiene rubber and 0.9 wt % of carboxylmethyl cellulose in distilled water to prepare a negative electrode active material layer composition, and the negative electrode active material layer composition alone was coated on both sides of a current collector and then, dried and compressed. After the compressing, a negative electrode active material layer on one side of the current collector had a thickness of about 100 μm.

Comparative Example 2

A negative electrode active material of Comparative Example 2 was prepared in the same manner as in Example 1 except that the first active material, the second active material, and the silicon-based active material were mixed in a weight ratio of 46.5:46.5:7.

96.38 wt % of the prepared negative electrode active material, 2.72 wt % of a styrene-butadiene rubber, and 0.9 wt % of carboxylmethyl cellulose were mixed in distilled water, preparing a first active material layer composition.

In addition, a second active material layer composition was prepared by mixing 98.42 wt % of the negative electrode active material, 0.68 wt % of a styrene-butadiene rubber, and 0.9 wt % of carboxylmethyl cellulose in distilled water. In the first active material composition, a content of the styrene-butadiene rubber used as a binder was about 4 times larger than that of the second active material composition.

The first active material layer composition and the second active material layer composition were simultaneously coated on both sides of a current collector by using a double slot die coating equipment and then, dried and compressed, so that the current collector, the first active material layer, and the second active material layer might be sequentially stacked. When a negative electrode plate obtained after the compressing was measured with respect to a thickness, the negative electrode active material layer on one side of the current collector had a thickness of about 100 μm, wherein the first active material layer had a thickness of about 50 μm, and the second active material layer had a thickness of about 50 μm.

Comparative Example 2 was to form the active material layer as a bilayer as in Example 1 by using 4 times more a binder of the first active material layer than that of the second active material layer and applying an active material mixture of the first and second active materials to both of the first second active material layers.

Evaluation Example 1: Evaluation of Porosity of Negative Electrode

Figure 2:
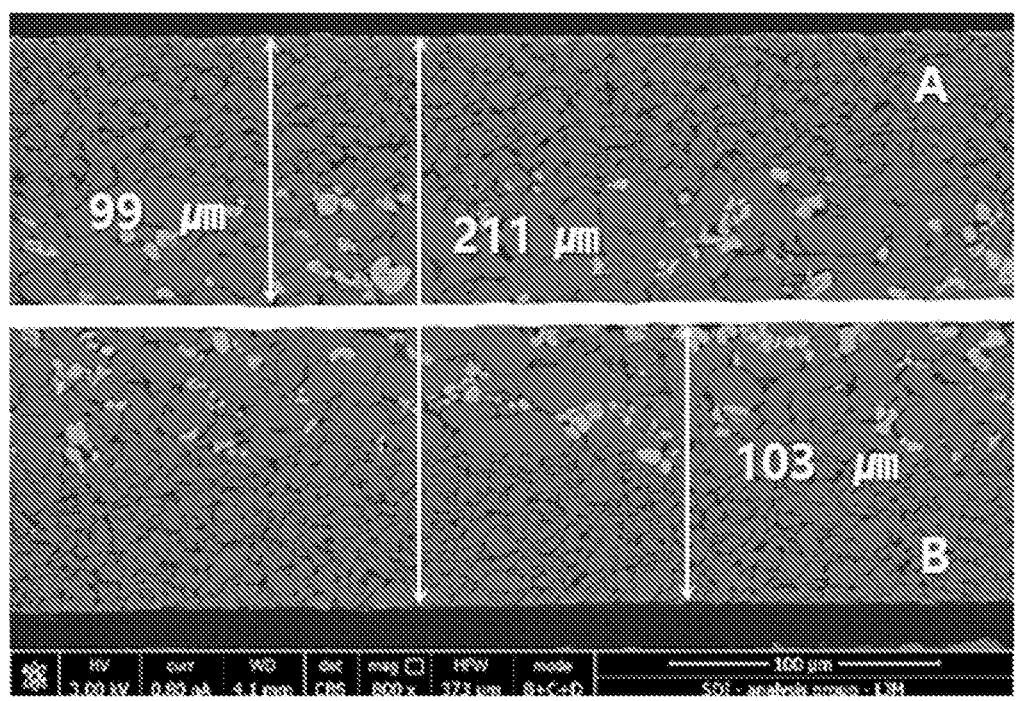
FIG. 2 is a scanning electron microscope (SEM) photograph of a cross-section of the negative electrode of Example 1.

FIG. 2 is a SEM photograph of a cross section of the negative electrode manufactured in Example 1. Each negative electrode active material layer was formed on both sides of a white current collector in the middle, wherein a first active material layer and a second active material layer on one surface of the current collector were sequentially stacked.

In the negative electrode active material layer on one surface of the current collector, the surface in contact with the current collector was defined as 100%, and the opposite surface was defined as 0%. A portion of the negative electrode active material layer corresponding to 55% to 95% excluding 95% to 100% where damage occurred during a preparation process of a sample, that is, corresponding to the first active material layer, was defined as a first region, and another portion of the negative electrode active material layer corresponding to 5% to 45% where damage occurred by the compressing and the like at the surface, that is, corresponding to the second active material layer, was defined as a second region.

Figure 3:
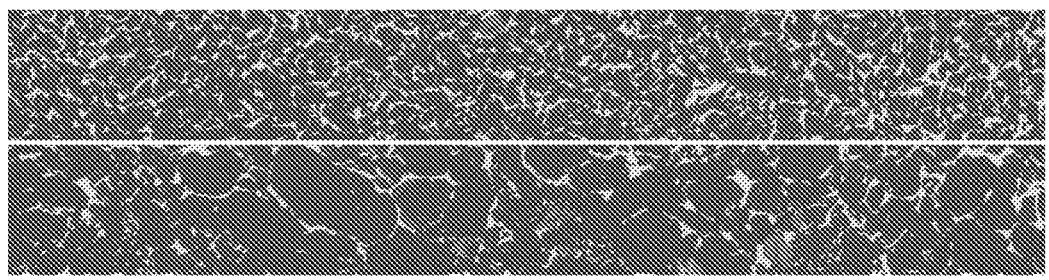
FIG. 3 is a photograph showing pores in the cross-section of the negative electrode of Example 1.

Image J, an image analysis program, was used to measure porosity of the first region and porosity of the second region of Example 1. FIG. 3 is an image where voids in the first region at the bottom and the second region at the top were marked as red. The porosity calculated through Image J was 11.643% in the first region and 18.776% in the second region.

Figure 4:
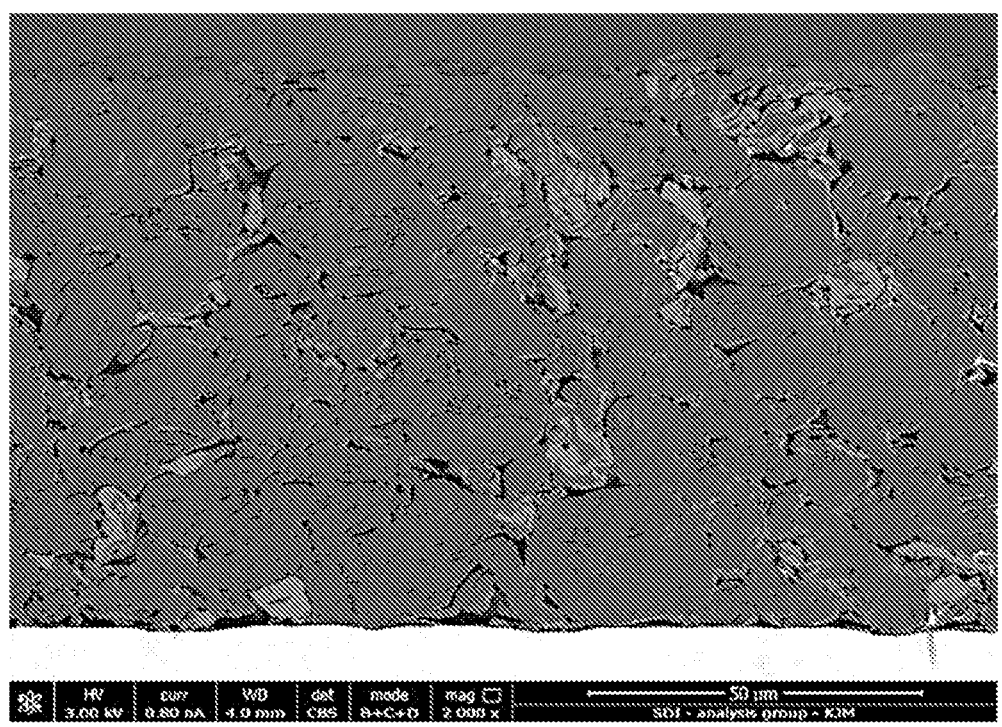
FIG. 4 is a SEM photograph of a cross-section of the negative electrode of Comparative Example 1.

FIG. 4 is an SEM photograph showing a cross-section of the negative electrode according to Comparative Example 1, in which a negative electrode active material layer was formed on a white current collector below. As a result of measuring porosity of the negative electrode according to Comparative Example 1 through the Image J program, porosity of the 5% to 10% region, the uppermost layer at the surface, was about 4.0%, porosity of the 10% to 45% region was about 8.6%, porosity of the 55% to 90% region was 7.8%, and porosity of the 90% to 95% region, the lowermost layer closest to the current collector, was 5.4%. In Comparative Example 1 using the first active material alone, porosity was similar throughout the negative electrode active material layer, but porosity of the uppermost layer was rather lower than that of the lowermost layer.

Figure 5:
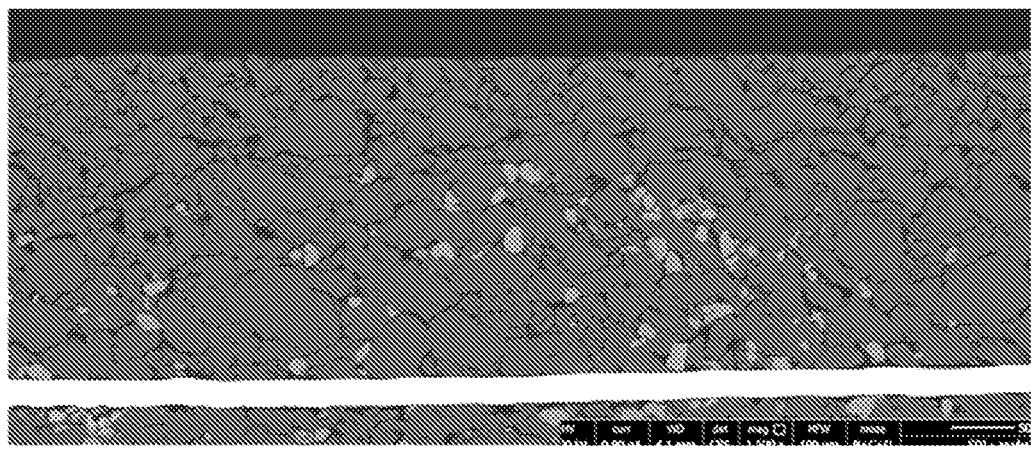
FIG. 5 is a SEM photograph of a cross-section of the negative electrode of Comparative Example 2.

FIG. 5 is an SEM photograph showing a cross-section of the negative electrode according to Comparative Example 2, in which the negative electrode active material layer was formed on the white current collector below. As a result of measuring porosity of the negative electrode according to Comparative Example 2 through the Image J program, the first region, 55% to 95% at the surface side, had porosity of 15.5%, and the second region, 5% to 45% at the current collector side, was 14.0%. Comparative Example 2 using a simple mixture of the first active material and the second active material exhibited similar porosity in the upper and lower regions.

Evaluation Example 2: SAICAS Evaluation

Figure 6:
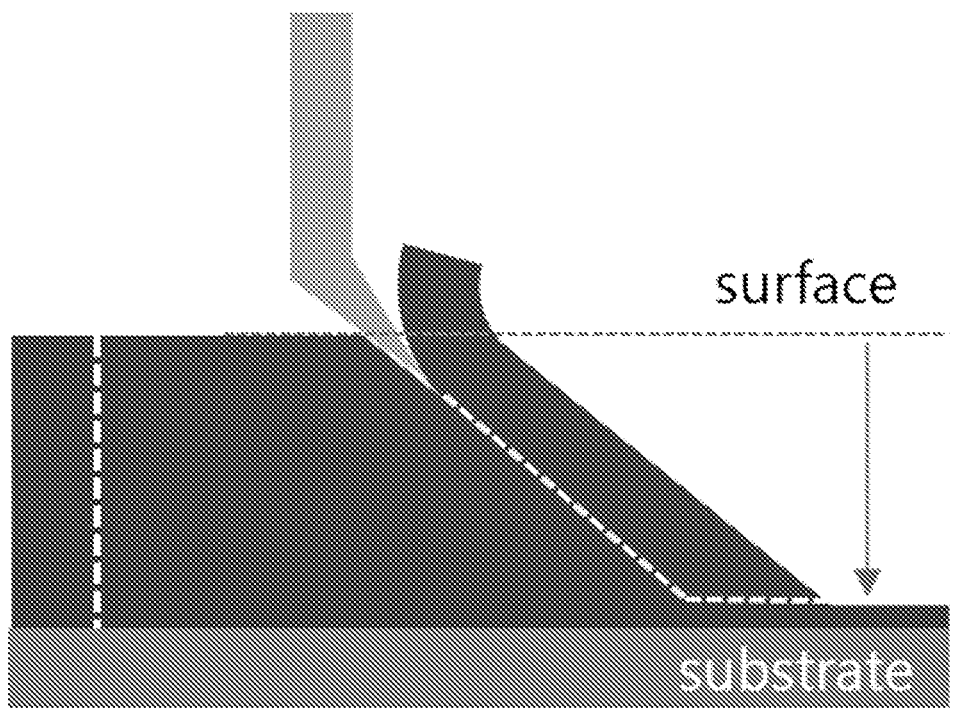
FIG. 6 is a view illustrating a method of measuring the adhesive strength of an active material layer by SAICAS.

The examples and the comparative examples were evaluated with respect to adhesive strength and the like of the negative electrode active material layers by using Surface and Interfacial Cutting Analysis System (SAICAS). FIG. 6 is a diagram showing a method of measuring an adhesive force and the like with the SAICAS equipment. As shown in FIG. 6, a force applied to a blade (peeling member or blade) according to a depth was recorded by entering the blade in a depth direction from the surface of each negative electrode active material layer to the other surface in contact with a current collector. The higher the porosity or the lower the adhesive force in the active material layer, the lower the resistance applied to the blade, but the lower the porosity or the higher the adhesive force, the higher the resistance applied to the blade.

Figure 7:
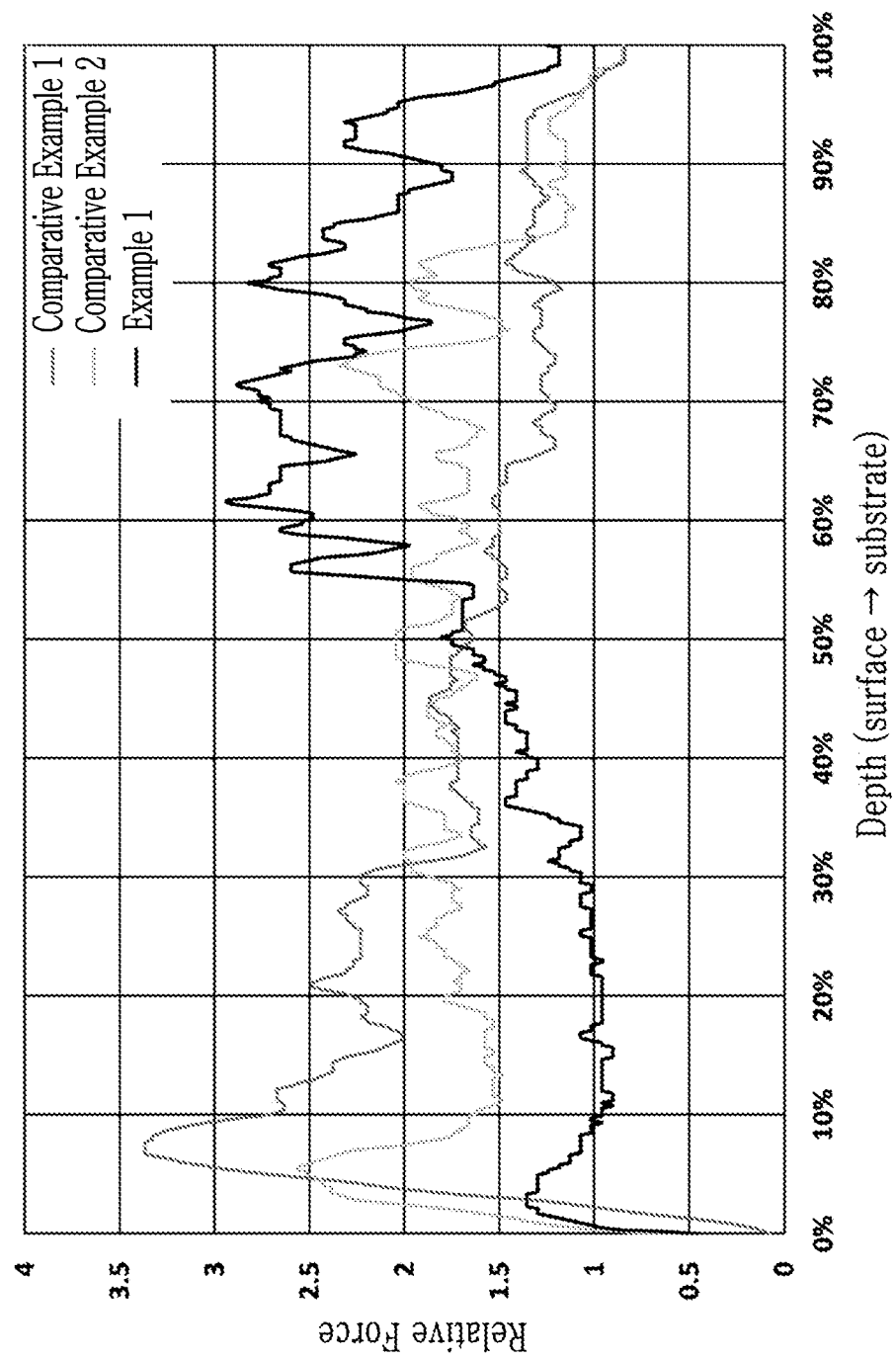
FIG. 7 is a graph showing the relative force applied to the blade according to the depth from the surface of the negative electrode active material layer to the current collector in examples and comparative examples, as measured by SAICAS.

FIG. 7 is a graph showing a relative force applied to the blade according to a depth from the surface (0%) of the negative electrode active material layer to the current collector (100%) as the SAICAS results of Example 1 and Comparative Examples 1 and 2. Referring to FIG. 7, Comparative Example 1 coated with a single slot die exhibited a higher force applied to the surface portion or the upper portion of the active material layer than to the lower portion, which exhibits that the upper portion had lower porosity and higher adhesive strength than the lower portion. Comparative Example 2, even though the coating was performed with a double slot die, and the lower portion included 4 times more a binder than the upper portion lower, exhibited a high compression ratio in the upper portion and thus almost the same force applied to the upper and lower portions. This is consistent with the result of Evaluation Example 1 in which the lower and upper portions exhibited similar porosity. On the contrary, Example 1 exhibited a lower force applied to the upper portion but a much higher force applied to the lower portion. This result means that the upper portion had high porosity and low adhesive strength, but the lower portion had low porosity and high adhesive strength. Example 1 and Comparative Example 2 all were double-layered electrodes having a higher binder content in the lower portion than the upper portion but exhibited a difference in the SAICAS relative forces, which shows that Example 1 had higher porosity than Comparative Example 2.

In the electrodes according to an embodiment, the first active material layer exhibited much higher adhesive strength than the second active material layer. For example, when measured with SAICAS, the adhesive strength of the second active material layer was 1.5 times to 3 times or 2 times to 3 times larger than that of the first active material layer. The result reflects that the first active material layer had higher porosity and included a binder in a lower content than the second active material layer.

Evaluation Example 3: Rate Charge/Discharge Evaluation of Battery Cells

Figure 8:
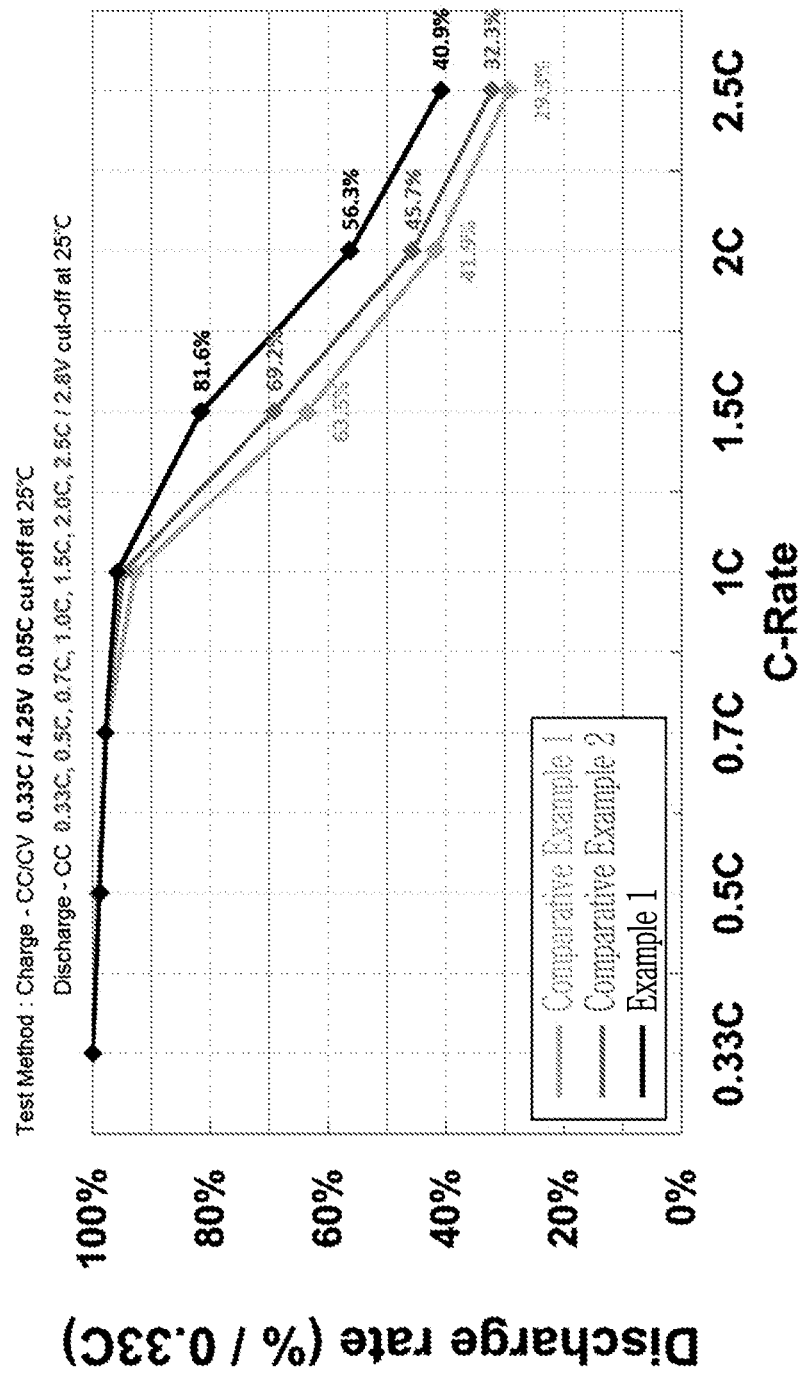
FIG. 8 is a graph showing evaluation of rate discharge characteristics of battery cells of examples and comparative examples.

The battery cells according to Example 1 and Comparative Examples 1 and 2 were charged to an upper voltage limit of 4.25 V at a constant current of 0.33 C in a constant voltage mode and cut off at a 0.05 C rate at 25° C. Subsequently, the cells were discharged to 2.8 V but at 0.33 C, 0.5 C, 0.7 C, 1.0 C, 1.5 C, 2.0 C, and 2.5 C and then, evaluated with respect to capacity retention at each rate, and the results are shown in FIG. 8. Referring to FIG. 8, Example 1 exhibited improved rate discharge characteristics, compared to Comparative Examples 1 and 2 at high discharge rates such as 1 C, 1.5 C, 2.0 C, 2.5 C, and the like.

Figure 9:
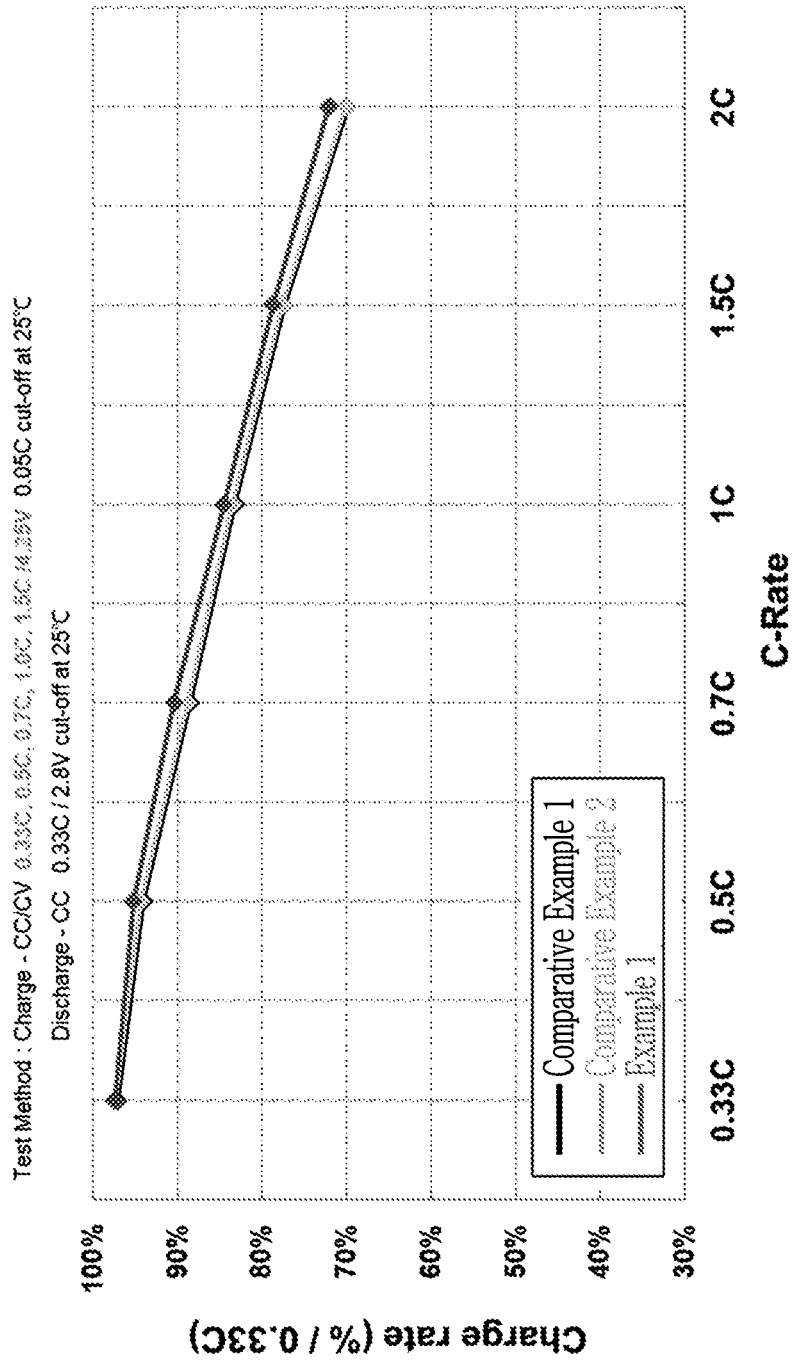
FIG. 9 is a graph showing evaluation of rate charge characteristics of battery cells of examples and comparative examples.

In addition, the cells according to Example 1 and Comparative Examples 1 and 2 were respectively charged to an upper limit voltage of 4.25 V at 0.33 C, 0.5 C, 0.7 C, 1.0 C, and 1.5 C and cut off at a 0.05 C rate in the constant voltage mode at 25° C. Subsequently, the cells were discharged to 2.8 V at 0.33 C. At this time, the cells were calculated with respect to a charge rate by each rate, and the results are shown in FIG. 9. Referring to FIG. 9, the cell of Example 1 exhibited improved high-rate charge characteristics, compared to the cells of Comparative Examples 1 and 2.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

[Description of Symbols]

100: rechargeable lithium battery
112: negative electrode
113: separator
114: positive electrode

| [Description of Symbols] |
| --- |
| 120: battery case |
| 140: sealing member |

The invention claimed is:

1. An electrode for a rechargeable lithium battery, comprising:
   a current collector,
   a first active material layer disposed directly on the current collector and including a first active material, and
   a second active material layer disposed on the first active material layer and including a second active material,
   wherein a porosity of the first active material layer is 8% to 12%, and
   a porosity of the second active material layer is 16% to 22%,
   wherein a specific surface area of the first active material is 1.5 m$^2$/g to 2.5 m$^2$/g, and
   a specific surface area of the second active material is less than or equal to 2.0 m$^2$/g, and
   wherein the electrode is a negative electrode.

2. The electrode of claim 1, wherein
   a pellet density of the first active material is greater than or equal to 1.7 g/cm$^3$, and
   a pellet density of the second active material is less than 1.6 g/cm$^3$.

3. The electrode of claim 1, wherein
   an average particle diameter (D50) of second active material is less than or equal to 15 µm.

4. The electrode of claim 1, wherein
   a product of an average particle diameter (D50) of the second active material and the specific surface area of the second active material is less than 20.

5. The electrode of claim 1, wherein
   each of the first active material layer and the second active material layer further includes a binder, and
   a weight ratio of the binder of the first active material layer to the binder of the second active material layer is 60:40 to 95:5.

6. The electrode of claim 1, wherein
   a ratio of a thickness of the first active material layer to a thickness of the second active material layer is 45:55 to 55:45.

7. The electrode of claim 1, wherein
   a thickness of the first active material layer and a thickness of the second active material layer are each 30 µm to 100 µm.

8. The electrode of claim 1, wherein
   each of the first active material and the second active material is a carbon-based active material.

9. A rechargeable lithium battery comprising
   the electrode of claim 1, a separator, and an electrolyte.

10. The electrode of claim 1, wherein the first active material layer further comprises 1 wt % to 20 wt % in amount of a silicon-based active material, based on a total weight of the first active material and the silicon-based active material.

* * * * *